(12) United States Patent
Yu (10) Patent No.: US 7,898,753 B2
(45) Date of Patent: Mar. 1, 2011

(54) APPARATUS FOR DRIVING A LENS BY ELECTROMAGNETIC FORCE

(75) Inventor: Teng-Chien Yu, Taipei (TW)

(73) Assignee: E-Pin Optical Industry Co., Ltd, Taipei (TW)

( * ) Notice: Subject to any disclaimer, the term of this patent is extended or adjusted under 35 U.S.C. 154(b) by 157 days.

(21) Appl. No.: 12/284,401

(22) Filed: Sep. 22, 2008

(65) Prior Publication Data

US 2009/0244731 A1    Oct. 1, 2009

(30) Foreign Application Priority Data

Mar. 27, 2008   (TW) ............................... 97111135 A (51) Int. Cl.
*G02B 7/02* (2006.01)
*G03B 13/34* (2006.01)

(52) U.S. Cl. .......... 359/824; 359/814; 359/694; 396/133

(58) Field of Classification Search ................ 359/814, 359/822–824, 811, 557, 676, 694, 696; 396/60, 396/72, 79, 85–88, 97, 133, 144; 348/208.2, 348/241, 335, 345, 372, 374; 720/682, 683; 250/201.2
See application file for complete search history.

(56) References Cited

U.S. PATENT DOCUMENTS

| | | | | |
|---|---|---|---|---|
| 4,416,513 A | * | 11/1983 | Uesugi | ............................ 359/824 |
| 4,841,323 A | * | 6/1989 | Yamada et al. | ................. 396/90 |
| 4,924,248 A | * | 5/1990 | Taniguchi et al. | ............... 396/60 |
| 5,572,270 A | * | 11/1996 | Yamamoto et al. | ............ 396/133 |
| 6,307,678 B2 | | 10/2001 | Kosaka et al. | |
| 6,449,434 B1 | | 9/2002 | Fuss | |
| 6,654,185 B1 | | 11/2003 | Liu et al. | |
| 6,687,062 B2 | | 2/2004 | Nakamura et al. | |
| 6,961,090 B2 | | 11/2005 | Oshima | |
| 7,002,879 B2 | | 2/2006 | Goami et al. | |
| 7,196,978 B2 | | 3/2007 | Iida et al. | |
| 7,212,358 B2 | | 5/2007 | Mattsson et al. | |
| 7,262,927 B1 | | 8/2007 | Shyu et al. | |
| 7,295,388 B2 | | 11/2007 | Shyu et al. | |
| 7,298,562 B2 | | 11/2007 | Sue et al. | |
| 7,609,956 B2 | * | 10/2009 | Huang et al. | .................... 396/85 |
| 2003/0227560 A1 | | 12/2003 | Mattsson et al. | |
| 2004/0130808 A1 | | 7/2004 | Yoneyama et al. | |

(Continued)

FOREIGN PATENT DOCUMENTS

JP       2005-037865        2/2005

(Continued)

*Primary Examiner* — Loha Ben
(74) *Attorney, Agent, or Firm* — Hudak, Shunk & Farine Co. LPA (57) ABSTRACT

An apparatus for driving a lens by electromagnetic driving force includes a frame, a barrel, a lens holder, a lens, a kicker, electromagnets and a resilient element. The barrel rotably mounted in the frame includes a first linkage structure. The lens holder includes a second linkage structure and is mounted on the barrel through the first and second linkage structures. The lens is coupled into the lens holder, and the kicker is mounted on an external wall of the barrel, and the electromagnets are mounted at the frame and the kicker respectively. The resilient element is connected to the barrel and the frame. The barrel can be pushed by a repulsion or attraction of a magnetic field produced by electrically conducting the electromagnets, and the first and second linking structures drive the lens holder to move from a first position to a second position.

5 Claims, 11 Drawing Sheets

U.S. PATENT DOCUMENTS

| | | |
|---|---|---|
| 2007/0047938 A1 | 3/2007 | Suzuki |
| 2007/0058070 A1 | 3/2007 | Chen |
| 2007/0097532 A1 | 5/2007 | Kuo et al. |
| 2007/0133110 A1 | 6/2007 | Huang |
| 2007/0146894 A1 | 6/2007 | Humpston |

FOREIGN PATENT DOCUMENTS

| | | |
|---|---|---|
| JP | 2005-195998 | 7/2005 |
| JP | 2005-258355 | 9/2005 |
| JP | 2005-275270 | 10/2005 |
| JP | 2006-101611 | 4/2006 |
| JP | 2006-293083 | 10/2006 |
| WO | WO 2007/026830 A1 | 3/2007 |

* cited by examiner

APPARATUS FOR DRIVING A LENS BY ELECTROMAGNETIC FORCE

FIELD OF THE INVENTION

The present invention relates to an apparatus applied in an auto-focus camera module for driving a lens by electromagnetic force, and more particularly to an apparatus for driving and controlling the movement of the lens by a pushing force produced by an electromagnet and a linkage structure.

BACKGROUND OF THE INVENTION

In general, an auto-focus or zoom lens module used in a digital camera usually comes with a very limited space, and the module must comply with the requirements for a light, thin, short and compact design as well as high precision and durability. Most of the conventional auto-focus or zoom lens modules use the electromagnetic force of a voice coil motor (VCM), a piezoelectric motor, or a solenoid to drive a lens module. As disclosed in U.S. Pat. Nos. 7,295,388, 6,654,185 and 7,298,562, a plurality of electromagnets are used to control the movement of a camera lens in different directions; or as disclosed in U.S. Pat. Application Nos. 2007/0097532, 2004/0130808, the direction of current inputted to the solenoid is controlled to generate different magnetic fields by the solenoid generates and produce attractions or repulsions by magnetic elements mounted on a camera casing to move the camera lens; or as disclosed in U.S. Pat. No. 7,262,927, U.S. Pat. No. 7,196,978, U.S. Pat. No. 7,002,879, U.S. Pat. No. 6,961,090, U.S. Pat. No. 6,687,062, US2007/0133110, Japan Pat. No. JP2005-037865, JP2005-258355, WO2007/026830, a solenoid, magnet and a resilient element (such as a spring or a resilient plate) of a voice coil motor (VCM) are used for the movement of the camera lens, or as disclosed in U.S. Pat. No. US2007/0146894, U.S. Pat. No. 7,212,358, US2003/0227560, Japan Pat. No. JP2006-293083, JP2006-101611, a piezoelectric motor made of a piezoelectric material is used for controlling the movement of the camera lens.

Figure 1:
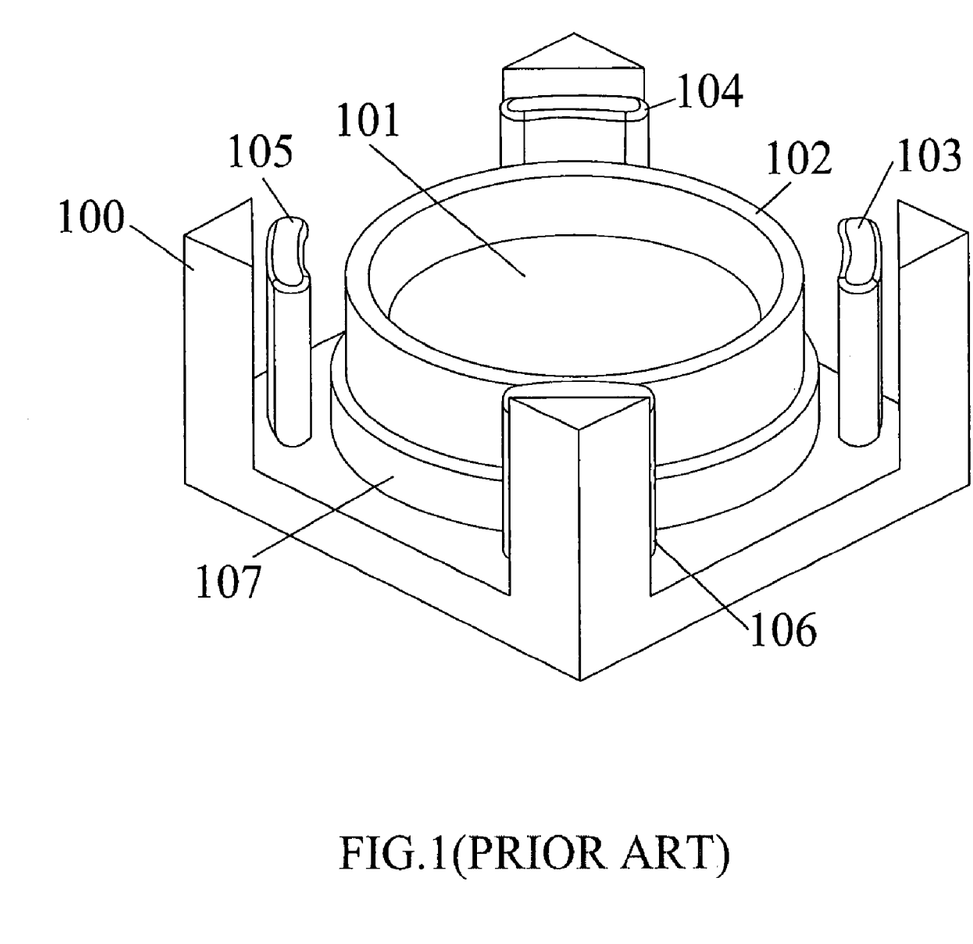
FIG. 1 is a schematic view of a prior art.

In FIG. 1, four permanent magnets 103~106 are mounted on the frame 100 of the conventional lens module to produce a magnetic field, and a barrel 107 is mounted onto the frame 100, and the lens 101 is coupled at the solenoid 102 and disposed in the barrel 107. After the solenoid 102 is conducted electrically to produce a magnetic field, the direction of the magnetic field produced by four permanent magnets 103~106 and upward or downward electromagnetic forces formed by magnetic poles are used for driving the camera lens to move. However, the permanent magnets 103~106 will be demagnetized by the high temperature of a reflow process (around 260° C. in reflow oven), and thus reflow process cannot be used for the manufacture of a lens driving apparatus that adopts the aforementioned conventional methods that use an electromagnetic force of a solenoid and a driving device of a permanent magnet, and thus the mass production efficiency will be restricted.

Further, a lens moving mechanism adopting a shaped memory alloy (SMA) is used, and the characteristics of thermal contractions and expansions of the SMA are used as the driving force source of an actuator as disclosed in U.S. Pat. Nos. 6,307,678, 6,449,434, 2007/0058070 and 2007/0047938 and Japan Pat. No. 2005-275270 and 2005-195998, but the thermal contraction and expansion of the SMA are relatively slow, and an instant auto-focus or zooming effect cannot be achieved easily.

In view of the foregoing shortcomings of the prior art, the inventor of the present invention based on years of experience in the related industry to conduct extensive researches and experiments, and finally developed an apparatus of driving a lens by an electromagnetic driving force in accordance with the present invention to overcome the shortcomings of the prior art.

SUMMARY OF THE INVENTION

The primary objective of the present invention is to provide an apparatus for driving a lens by electromagnetic force to overcome the shortcomings of the prior art including the complicated structure, the bulky size, and the difficulty of manufacture by a reflow process for the assembly of a lens module.

To achieve the foregoing objective, the present invention provides a lens moving mechanism adopting electromagnetic forces for an auto-focus or zoom lens module. The lens moving mechanism comprises a frame, a barrel, a lens holder, a lens, a kicker, plurality of electromagnets and a resilient element. The barrel is rotably mounted on the frame, such that the barrel can be rotated on the frame, and the barrel includes a first linkage structure. The lens is coupled in the lens holder, and the lens holder includes a second linkage structure, and the lens holder is mounted on the barrel by the first linkage structure through the second linkage structure, such that the lens holder can move in the direction along the central axis of the barrel. The kicker is disposed on an external wall of the barrel, and the plurality of electromagnets is mounted to the frame and the kicker, respectively, and the resilient element is anchored with the frame and the barrel. After an electric power is applied to the electromagnets, an electromagnetic field is generated to produce a repulsion force or an attraction force between the electromagnets to move the kicker and the barrel. The lens holder is driven by the second linkage structure through the movement of the first linkage structure to move lens holder along the central axis from a first position to a second position. After the power supplied to the electromagnets is disconnected, the resilience of the resilient element rotates the barrel to drive the lens holder by the second linkage structure through the first linkage structure to move along the central axis from the second position back to the first position.

Currents in opposite directions are supplied to two corresponding oppositely mounted electromagnets, so that a repulsion force is produced at the distal surfaces of the electromagnets by the magnetic field in the same direction to push and rotate the barrel.

The first linkage structure and the second linkage structure are preferably a combination of a slide slot and a fixing pillar, and the fixing pillar is passed through the slide slot and can be moved in the slide slot.

The combination of the first linkage structure and the second linkage structure is preferably a combination of a barrel threaded cut surface and a lens holder threaded cut surface, and the barrel threaded cut surface and the holder threaded cut surface are corresponsive with each other. When the lens holder is situated at the first position, the barrel threaded cut surface is engaged with the holder thread.

The first linkage structure and the second linkage structure are preferably a first thread disposed on the internal side of the barrel and a second thread disposed on the external wall of the lens holder respectively, and the lens holder and the barrel are coupled by engaging their threads.

The resilient element is a compression spring or an extendable spring, and can be mounted between the kicker and the frame, or mounted between the barrel and the frame to produce a resilience force.

The resilient element can be anchored between the kicker and the frame.

In summation of the description above, the apparatus for driving a lens by an electromagnetic force in accordance with the present invention includes the following advantages:

(1) The lens driving apparatus comes with a simple structure that can be manufactured easily, and thus the reliability and the life expectancy of the product can be enhanced.

(2) The lens driving apparatus includes no permanent magnet, and thus the reflow process can be used in the manufacturing process to improve the feasibility of a mass production of the products.

(3) The lens driving apparatus is capable of controlling the lens holder for a quick movement to achieve the instant zooming and auto-focus effects.

(4) The lens moving mechanism comes with a simple control mechanism, an easy manufacture and a low cost.

To make it easier for our examiner to understand the technical characteristics and effects of the present invention, we use preferred embodiments and related drawings for the detailed description of the present invention as follows:

DETAILED DESCRIPTION OF THE PREFERRED EMBODIMENTS

The major elements adopted by an apparatus for driving a lens by electromagnetic force in accordance with the following preferred utilizable embodiments are used for illustrating the present invention, but equivalent components can be used in the auto-focus or zoom lens module as disclosed in these embodiments, in addition to those used in the apparatus for driving a lens by electromagnetic force in accordance with the present invention. It is noteworthy that the persons skilled in the art can make modification and changes to the auto-focus or zoom lens module such as the shape of a frame and a barrel of the lens module, the interior spatial design of the lens module, the overall shape and structure of a camera lens composed of a lens, a lens holder and a barrel, or the number of lens, the way of combining a lens with a lens holder to form a camera lens, the number of turns in a solenoid or the area of the internal diameter of the electromagnets, the direction and the magnitude of current entering into the electromagnets are limited to those as disclosed in the preferred embodiments only. The magnitude and direction of current can be computed according to the principle of electromagnetism and the related ampere's right hand rule as shown in Equations (1) and (2) below:

$$B = \mu_0 \cdot \mu_r \cdot \frac{N}{L} \cdot I \tag{1}$$

$$\vec{F} = k \cdot \frac{\vec{m_1} \cdot \vec{m_2}}{r^2} \tag{2}$$

where, B represents the magnetic flux density (in Gauss), $\mu_o$ represents the vacuum permeability, $\mu_r$ represents the permeability of the electromagnet core, I represents the current (in Amp) of the solenoid, N/L represents the number of turns of the solenoid per unit length of the electromagnet, k is a constant, $m_1$ and $m_2$ represent the magnetic fluxes (in Maxwell) of the two electromagnet respectively, $m_1$ and $m_2$ are calculated by multiplying the magnetic flux density of the electromagnet by the distal surface area (in $cm^2$) of the electromagnet core, r represents the distance between the distal surfaces of two electromagnet cores, and F represents the magnitude of attraction force or repulsion force determined by the direction of current. Referring to Equation (1) and Equation (2), the magnetic flux density of the electromagnet (2071/2072) and the magnitude and direction of the attraction or repulsion F of the invention are calculated, and the weight of the camera lens is also taken into consideration to design the best driving force.

Referring to the related figures, preferred embodiments of an apparatus for driving a lens by electromagnetic force in accordance with the invention are disclosed for illustrating the invention, and same numerals are used for representing same respective elements used in the preferred embodiments.

Figure 2:
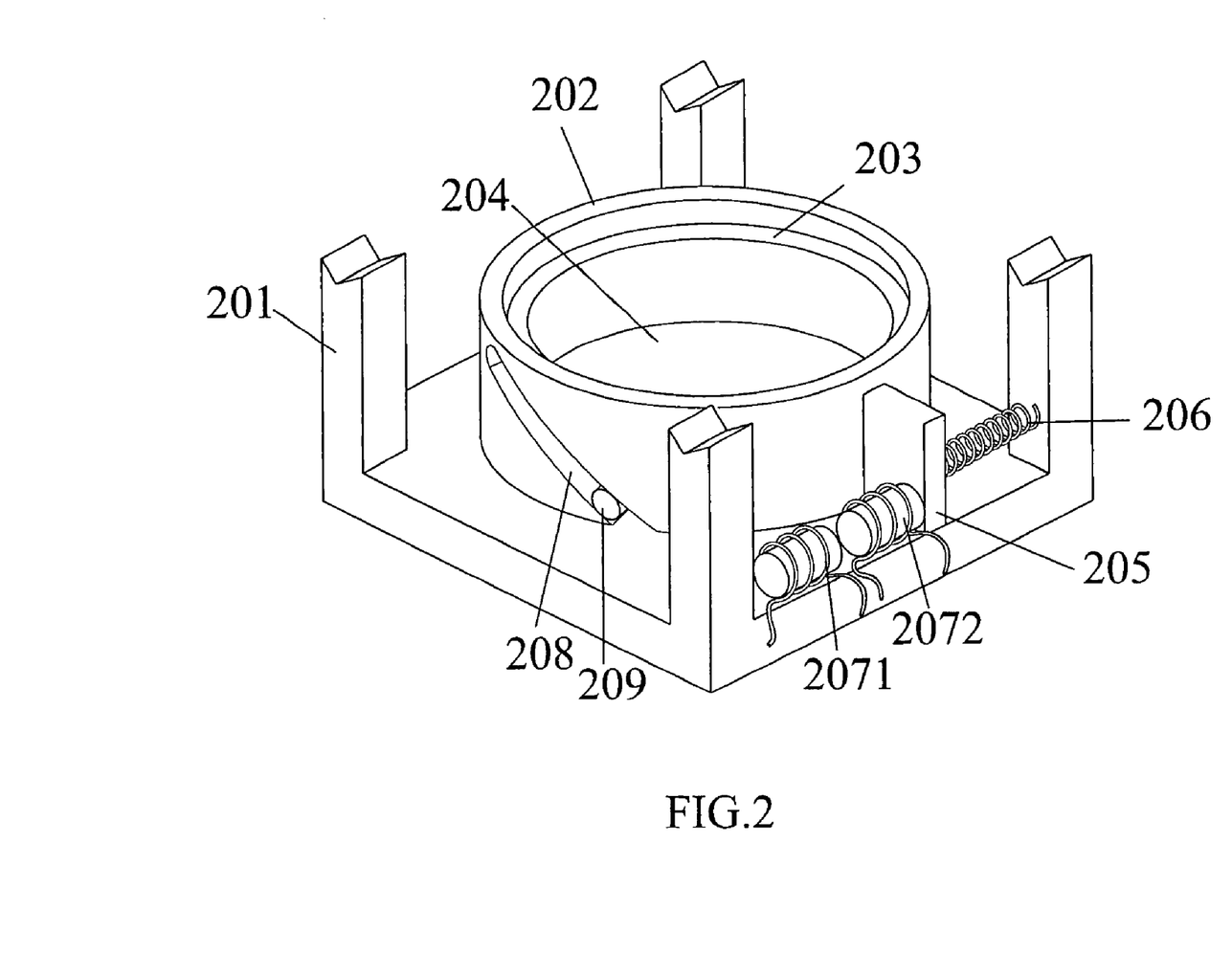
FIG. 2 is a perspective view of an apparatus for driving a lens by an electromagnetic force in accordance with a first preferred embodiment of the present invention.
Figure 3:
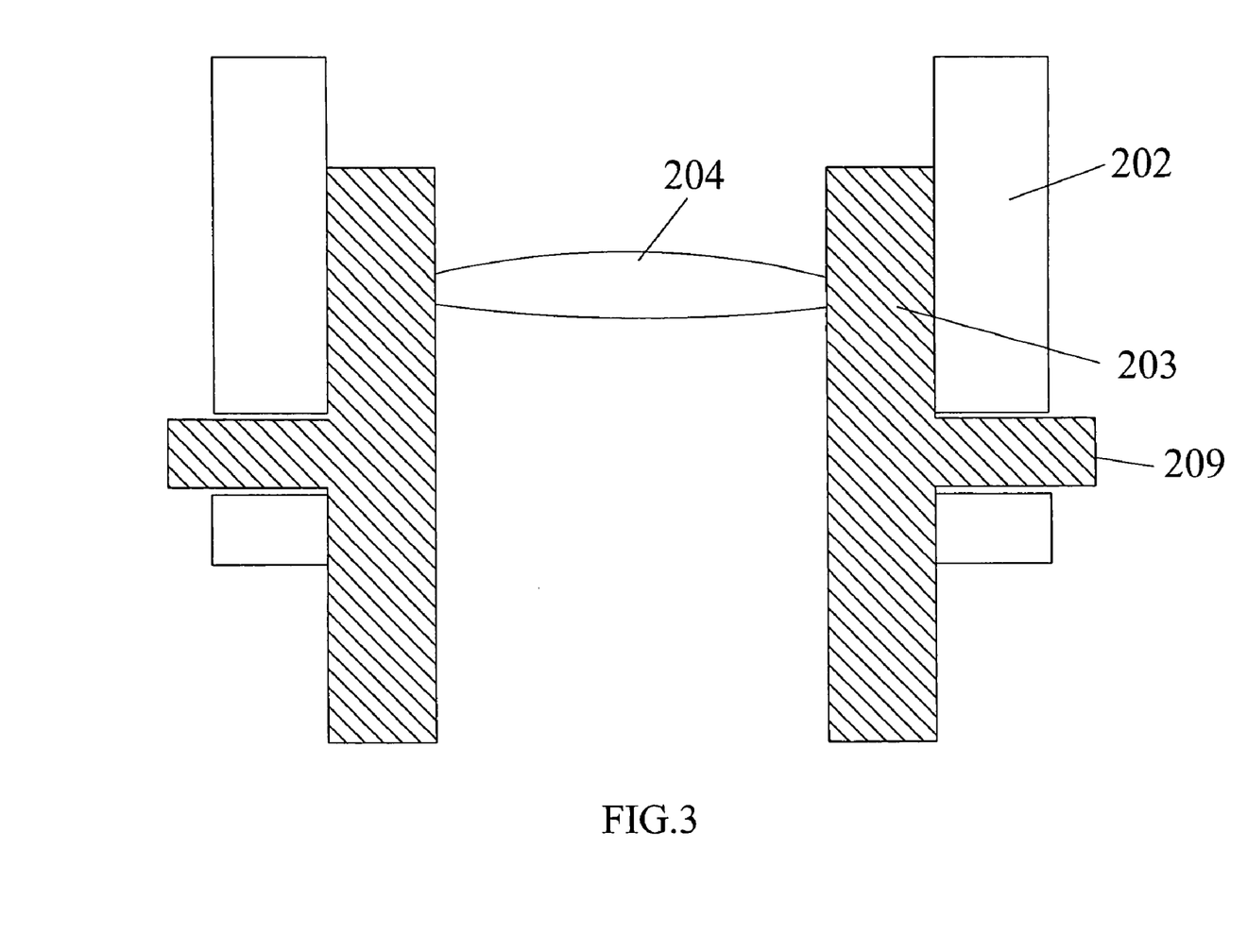
FIG. 3 is a cross-sectional view of an apparatus for driving a lens by an electromagnetic force in accordance with a first preferred embodiment of the present invention.
Figure 4:
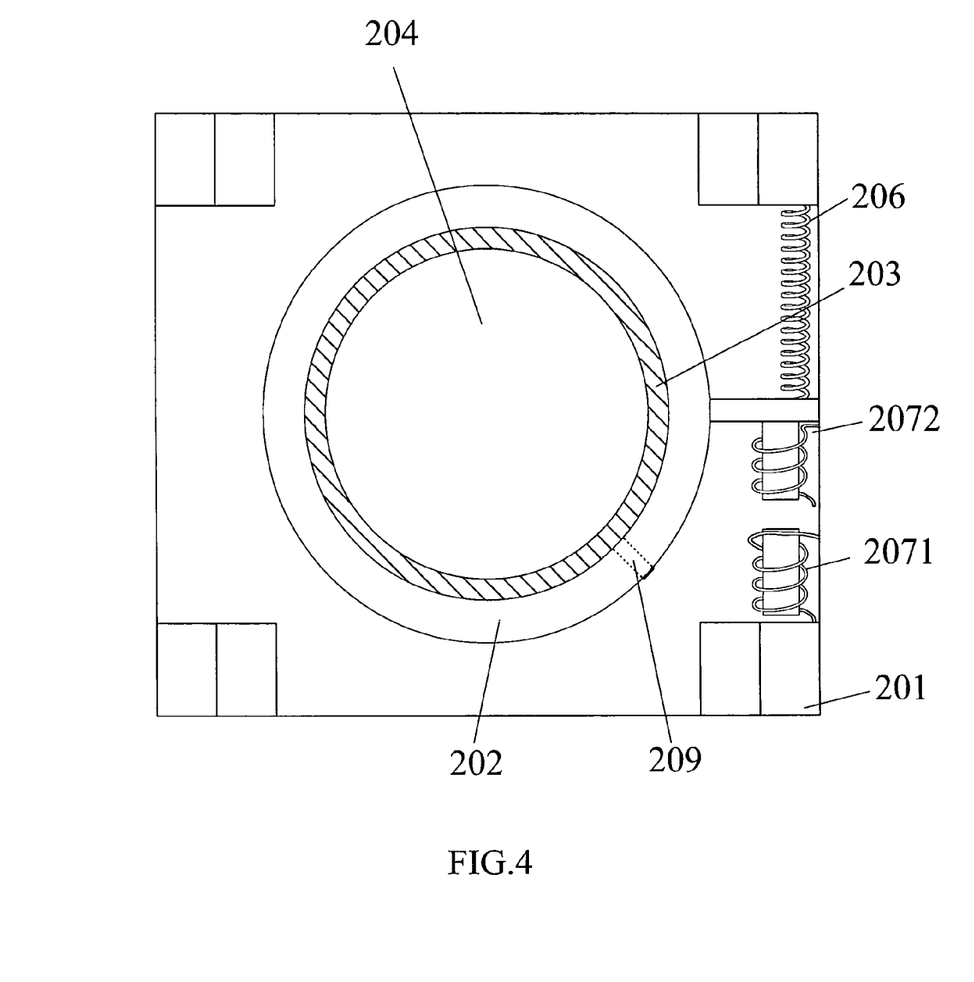
FIG. 4 is a top view of an apparatus for driving a lens by an electromagnetic force in accordance with a first preferred embodiment of the present invention.

Referring to FIGS. 2 to 4 for a perspective view, a cross-sectional view and a top view of an apparatus for driving a lens by an electromagnetic force in accordance with a first best embodiment of the present invention, the first linkage structure is a slide slot 208, and the second linkage structure is a fixing pillar 209. In FIG. 2, the lens driving apparatus comprises a frame 201, a barrel 202, a lens holder 203, a lens 204, a kicker 205, a resilient element (or a spring element) 206 and a plurality of electromagnets (or electromagnet parts) 2071 and 2072. The lens 204 is coupled in the lens holder 203 and can be moved according to the lens holder 203. The kicker 205 is mounted on an external wall of the barrel 202 and coupled to the barrel 202, and the electromagnet 2072 is mounted on the kicker 205, and the electromagnet 2071 is mounted on the frame 201, and both ends of the resilient element 206 are anchored with the kicker 205 and the frame 201 respectively. The barrel 202 is rotably mounted on the frame 201 such that the barrel 202 can be rotated on the frame 201. The lens holder 203 includes a fixing pillar 209, and the barrel 202 includes a slide slot 208, and an included angle exists between the track of the slide slot 208 and the central axis of the barrel 202. Since the lens holder 203 is mounted in the barrel 202 and the fixing pillar 209 is passed into the slide slot 208, the lens holder 203 and the barrel 202 can be coupled by the fixing pillar 209 and the slide slot 208.

Figure 5:
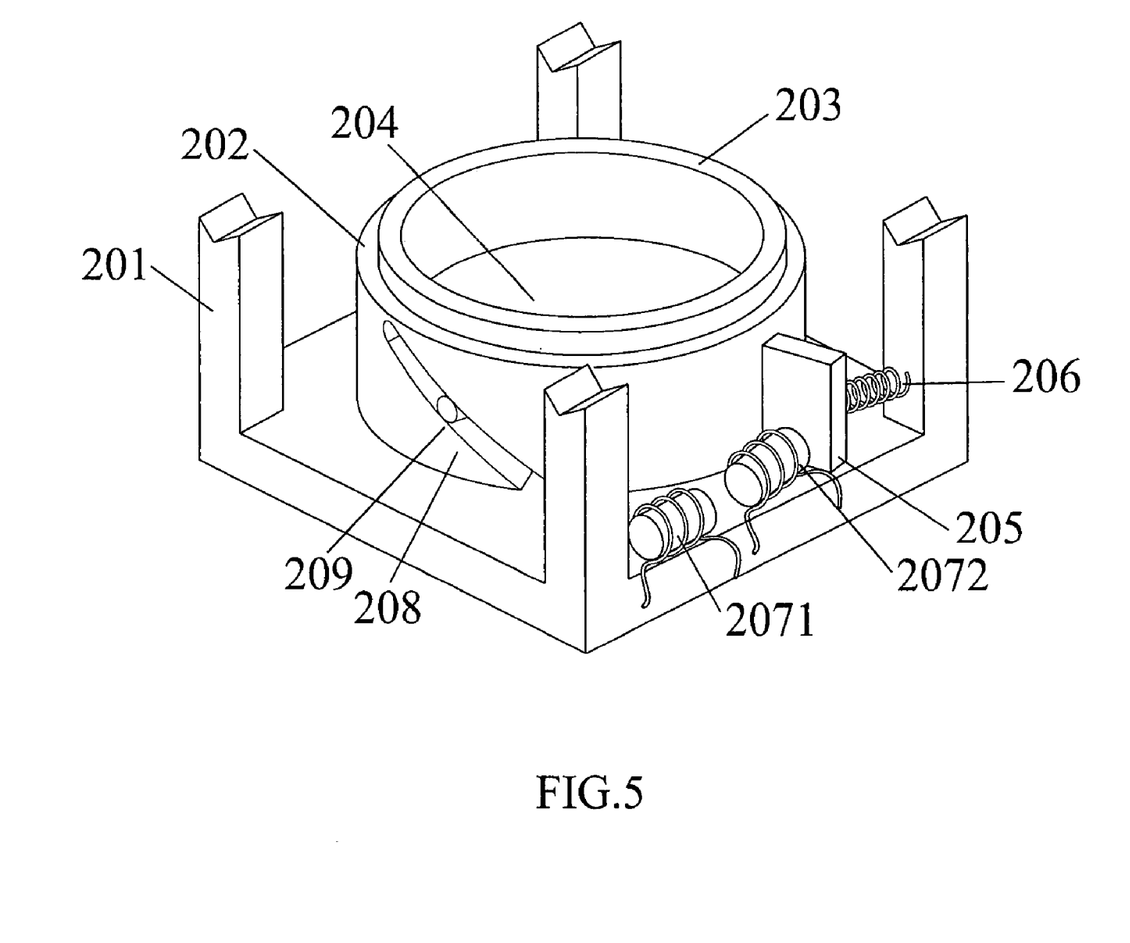
FIG. 5 is a perspective view of a lens holder situated at a second position as depicted in FIG. 2.
Figure 6:
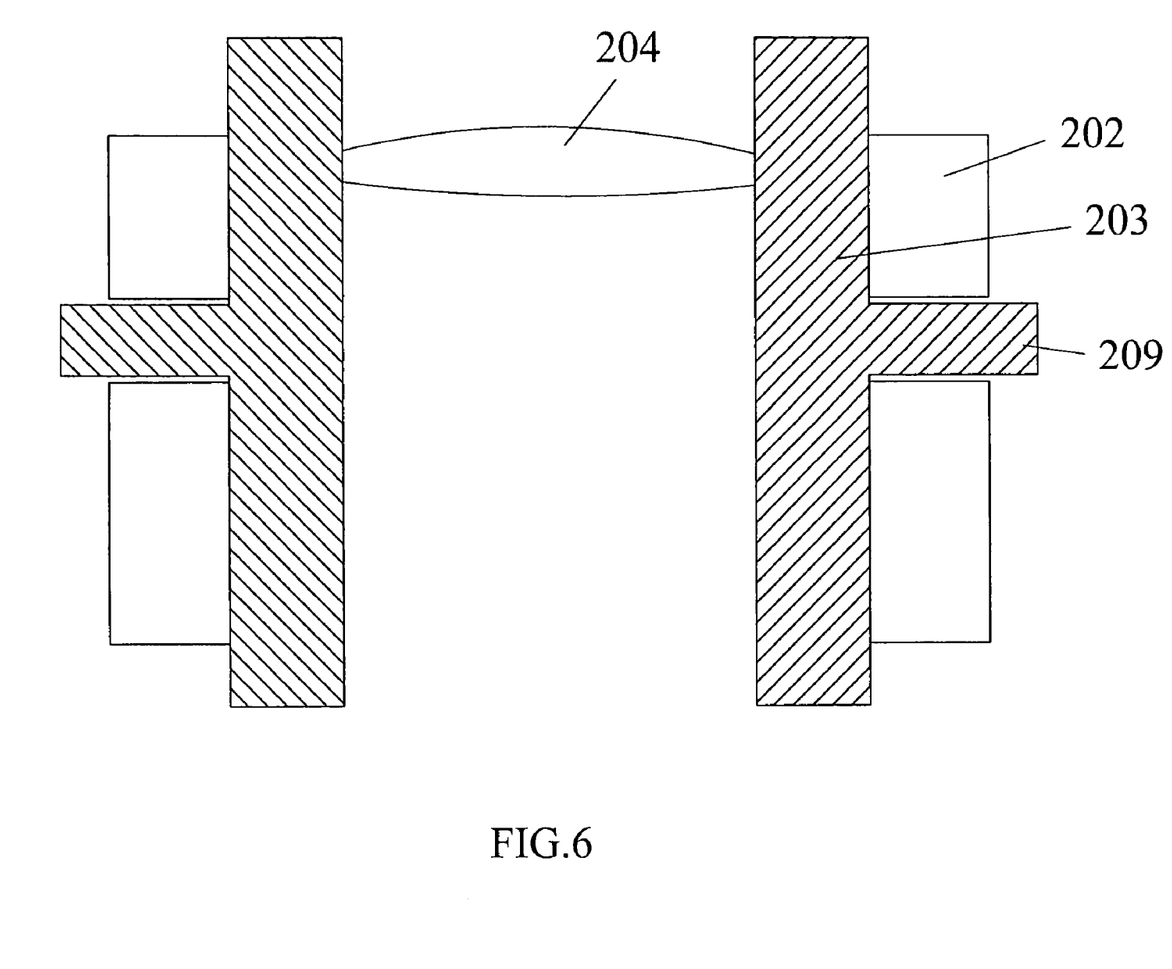
FIG. 6 is a cross-sectional view of a lens holder situated at a second position as depicted in FIG. 2.

Referring to FIGS. 5 and 6 for a perspective view and a cross-sectional view of an apparatus for driving a lens by an electromagnetic driving force in accordance with a first preferred embodiment of the present invention, the electromagnet 2071 and the electromagnet 2072 are arranged in corresponding opposite sides. If a current is passed through the electromagnet 2071 in a counterclockwise direction, the positive electrode of the current enters into the electromagnet, according to the ampere's right hand rule, the direction of the magnetic field at a distal surface of the electromagnet 2071 is the N pole. If a current is passed through the electromagnet 2072 in a clockwise direction, the direction of the magnetic field at a distal surface of the electromagnet 2072 corresponding to the electromagnet 2071 is the N pole too. Therefore, a repulsion force is formed by the magnetic field produced in the same direction between the distal surfaces of the two electromagnets 2071 and 2072. Since the barrel 202 can be rotated on the frame 201, the repulsion forces the kicker 205 to move away from the electromagnet 2071 to rotate the barrel 202. Since the fixing pillar 209 is passed into the slide slot 208, the lens holder 203 is rotated and moved in the direction with respect to the central axis of the barrel 202, when the barrel 202 rotates to drive the fixing pillar 209 to move along the slide slot 208. In FIG. 5, the fixing pillar 209 is forced to rotate upward when the barrel 202 is rotated to the right side, and the fixing pillar 209 is forced to rotate downward when the barrel 202 is rotated to the left side, so that the lens holder 203 can be rotated and displaced in the direction along the central axis.

Since both ends of the resilient element 206 are anchored with the kicker 205 and the frame 201, respectively, the resilient element 206 is compressed to produce a resilience force when the kicker 205 is moved away from the electromagnet 2071, and the rotating angle of the barrel 202 becomes greater. The greater the compression, the greater the resilience force of the resilient element 206. Until the repulsion is equal to the resilience, the lens holder 203 will not stop rotating. In the comparison of FIG. 5 with FIG. 2, when the positions of the fixing pillar 209 and lens holder 203 as shown in FIG. 5 are higher than those as shown in FIG. 2 respectively, the resilient element 206 is deformed by being compressed. If the current supplied to the electromagnet 2071 and the electromagnet 2072 is cut of, the repulsion between the electromagnet 2071 and the electromagnet 2072 disappears, and the resilience of the resilient element 206 provides a resilience force opposite to the repulsion to force the kicker 205 to move away from the frame 201, and drive the barrel 202 to rotate in an opposite direction until the resilient element 206 resumes its original status, and then the lens holder 203 will stop its rotation. In the rotating process of the lens holder 203, the fixing pillar 209 slides down along the slide slot 208 to return the lens holder 203 to a position as shown in FIG. 2.

The track and the length of the slide slot 208 and the included angle with respect to the central axis of the barrel 202 can be adjusted as needed. For instance, if the track of the slide slot 208 is linear, the axial movement of the lens holder 203 and the turning arc length of the barrel 202 (lateral moving distance) are related with each other in a tangent function $\tan(\theta)$, where $\theta$ is the included angle between the slide slot 208 and the central axis of the barrel 202.

In this embodiment, the magnitude of current applied to the electromagnet 2071, and the electromagnet 2072 complies with the rotation moment of the resilient element 206 and the barrel 202, so that the displacement d of the lens holder 203 in the central axis can be calculated or obtained from an experiment as shown in Table 1 below

TABLE 1

The displacement of a Lens Controlled by Current

| | Electromagnet 2071/Electromagnet 2072 | | | |
|---|---|---|---|---|
| Current(mA) Direction | 100/100 Clockwise/ Counter-clockwise | 100/200 Clockwise/ Counter-clockwise | 200/100 Clockwise/ Counter-clockwise | 100/100 Clockwise/ Clockwise |
| displacement d(mm) | 0.2 | 0.25 | 0.3 | −0.3 |

Figure 7:
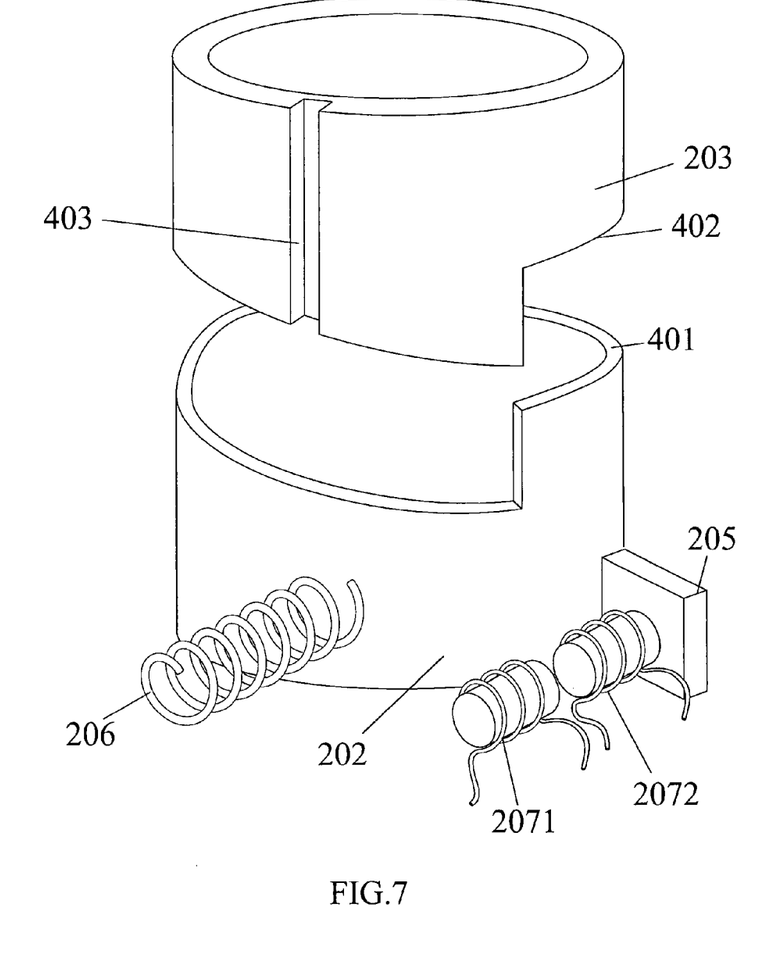
FIG. 7 is an exploded view of an apparatus for driving a lens by an electromagnetic force in accordance with a second preferred embodiment of the present invention.
Figure 8:
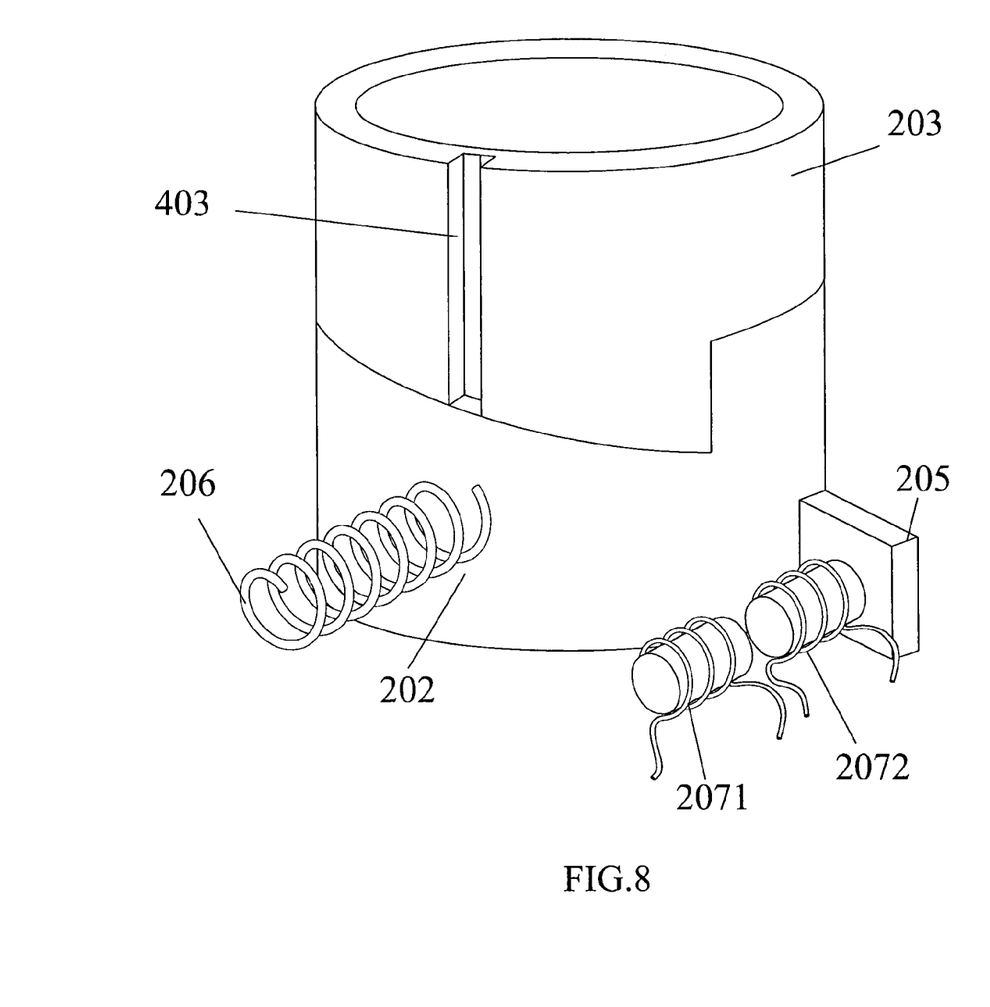
FIG. 8 is a perspective view of an apparatus for driving a lens by an electromagnetic force in accordance with a second preferred embodiment of the present invention.
Figure 9:
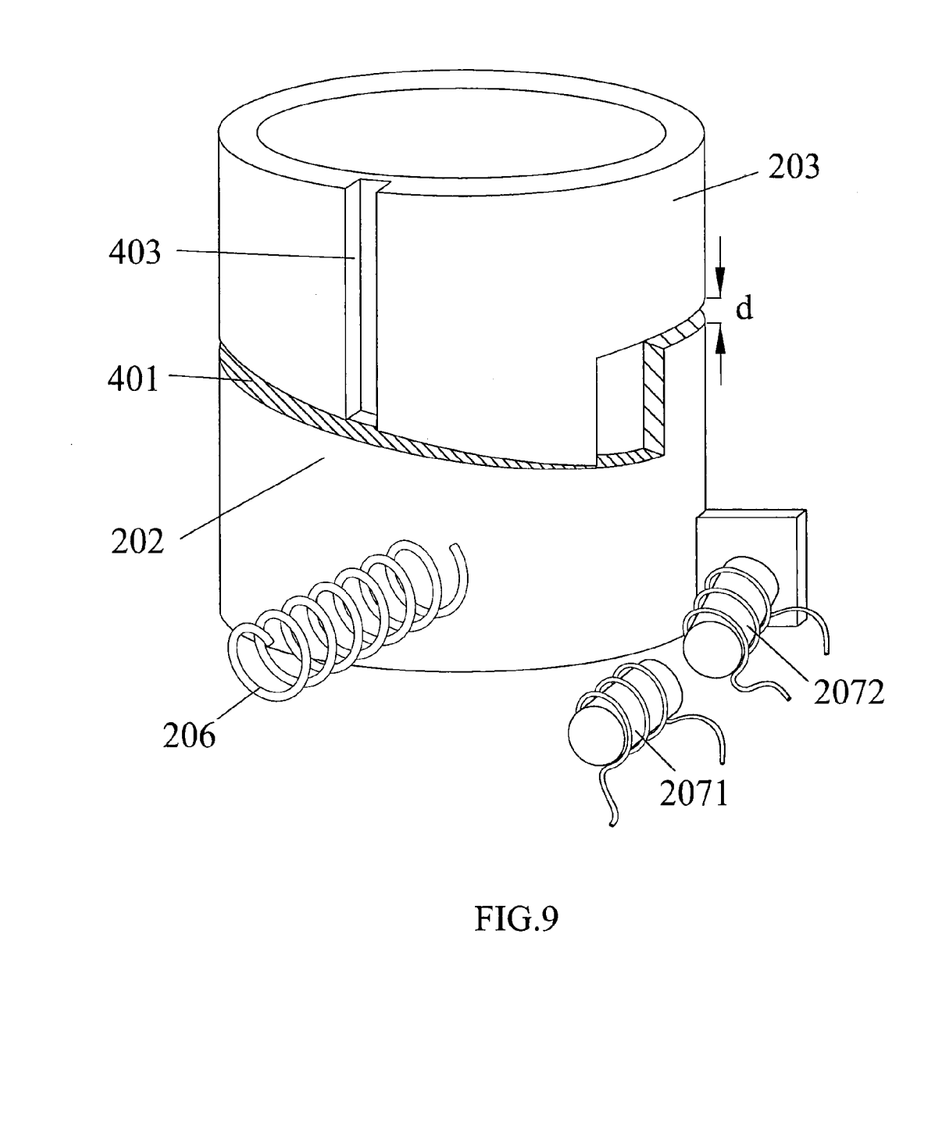
FIG. 9 is a schematic view of operating an apparatus for driving a lens by an electromagnetic force in accordance with a second preferred embodiment of the present invention.

Referring to FIGS. 7 to 9 for an exploded view, a perspective view and a schematic view of an apparatus for driving a lens by an electromagnetic driving force in accordance with a second best embodiment of the present invention respectively, the first linkage structure is a barrel threaded cut surface 401, and the second linkage structure is a holder threaded cut surface 402. The difference between the second embodiment and the first embodiment resides on that the barrel 202 includes a barrel threaded cut surface 401, and the lens holder 203 includes a holder threaded cut surface 402, and the barrel threaded cut surface 401 and the holder threaded cut surface 402 are engaged with each other to coupled the lens holder 203 and the barrel 202, and the lens holder 203 and the frame 201 have a groove 403 and a guiding device (not shown in the figure) respectively, and the groove 403 and the lens holder 203 are coupled with other, so that they cannot be rotated with respect to each other. The lens holder 203 can be displaced in the direction along the central axis of the barrel 202 as shown in FIG. 8. In FIG. 8, showing the status of original position of the lens driving apparatus whenas the electromagnet 2071 and the electromagnet 2072 are not supplied with currents. Once the electric currents are supplied to the electromagnet 2071 and the electromagnet 2072 to produce a repulsion force between the electromagnet 2071 and the electromagnet 2072, the force moves the kicker 205 away from the electromagnet 2071 and drives the barrel 202 to rotate. In FIG. 9, if the barrel 202 is rotated, the barrel threaded cut surface 401 pushes the holder threaded cut surface 402 to drive the lens holder 203 to displace with a displacement upward.

In this embodiment, the resilient element 206 is anchored between the barrel 202 and the frame 201 (not shown in FIGS. 7 to 9), while the current supplied to the electromagnet 2071 and the electromagnet 2072 is cutoff, the repulsion disappears, and thus the resilience of the resilient element 206 forces the barrel 202 to rotate in a reverse direction to resume the lens holder 203 to its original status as shown in FIG. 8.

Figure 10:
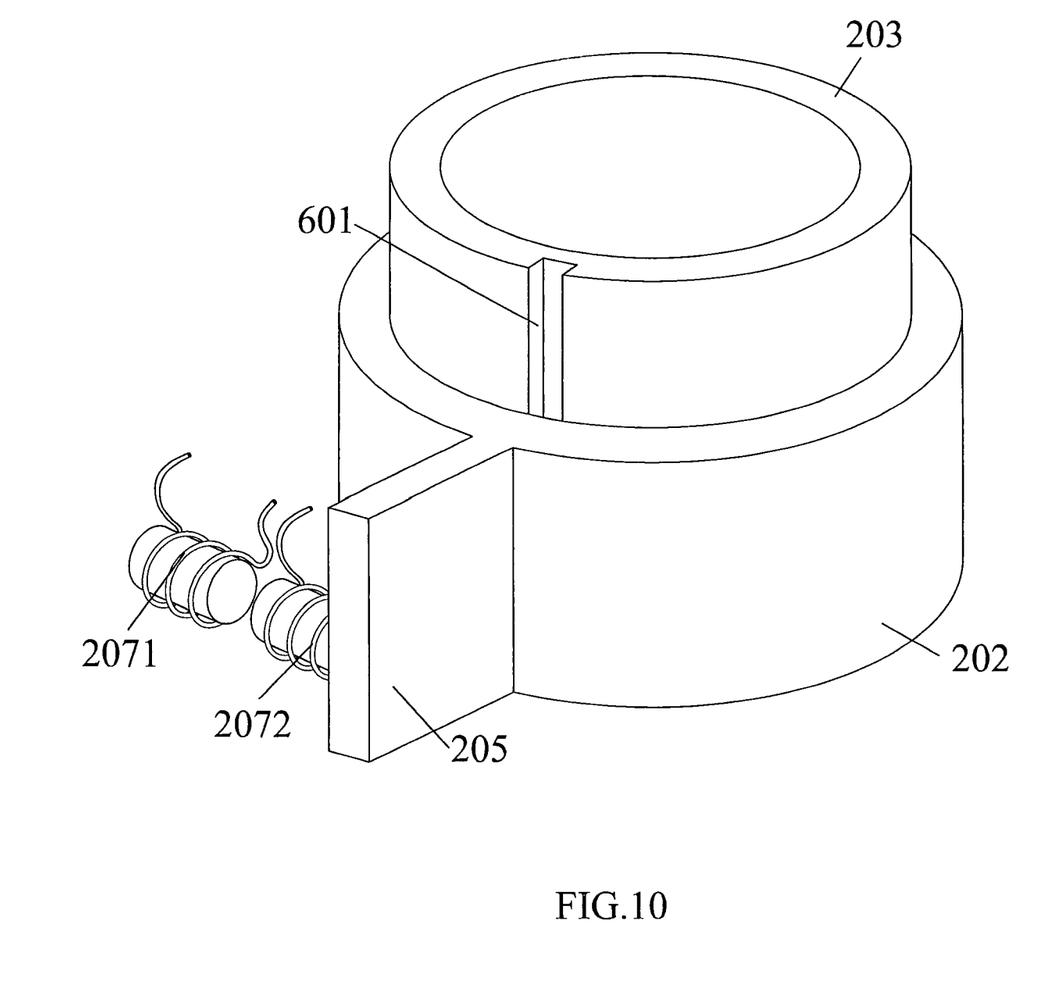
FIG. 10 is a perspective view of an apparatus for driving a lens by an electromagnetic force in accordance with a third preferred embodiment of the present invention.
Figure 11:
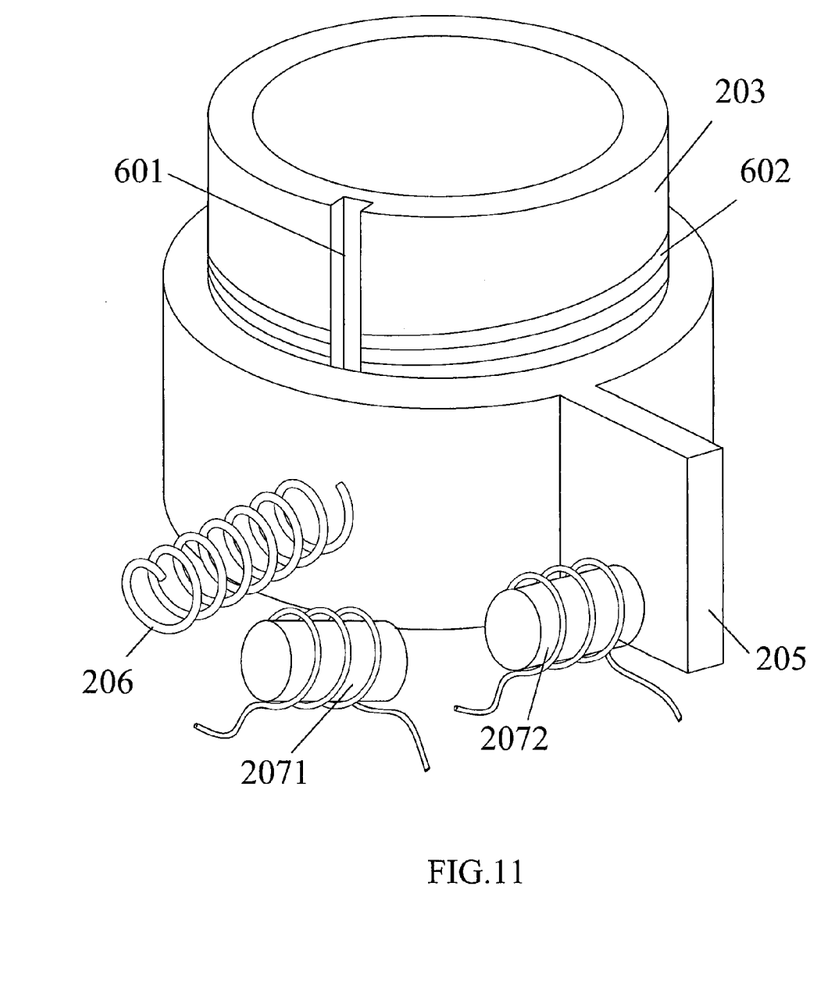
FIG. 11 a schematic view of operating an apparatus for driving a lens by an electromagnetic force in accordance with a third preferred embodiment of the present invention.

Referring to FIGS. 10 and 11 for a perspective view and a schematic view of a lens driving apparatus in accordance with a third best embodiment of the present invention, the first linkage structure is a first thread (which is a male thread in this embodiment) disposed on an internal side of the barrel, and the second linkage structure is a second thread (which is a female thread in this embodiment) disposed on an external wall of the lens holder. The difference between the third embodiment and the aforementioned embodiments resides on that the external wall of the lens holder 203 includes a male thread 602, and the internal side of the barrel 202 includes a female thread (not shown in the figure), and the lens holder 203 is mounted in the barrel 202, and the male thread 602 and the female thread are engaged to couple the barrel 202, and the lens holder 203 and the frame 201 have a groove 601 and a guiding device (not shown in the figure) respectively. Since the groove 601 and the guiding device are coupled to prevent the lens holder 203 from being rotated, the lens holder 203 is displaced in the direction along the central axis (which is also a central axis of the camera lens) of the barrel 202. In FIG. 10, showing the status of original position of the lens driving apparatus whenas the electromagnet 2071 and the electromagnet 2072 are not supplied with currents.

If currents in different directions are applied to the electromagnet 2071 and the electromagnet 2072, a repulsion force will be produced between the electromagnet 2071 and the electromagnet 2072, and the repulsion forces the kicker 205 to move away from the electromagnet 2071 and drives the barrel 202 to rotate. Since the groove 601 is mounted on the guiding device on the frame 201, the lens holder 203 can be moved in the direction along the central axis of the barrel 202 but cannot be rotated, such that when the barrel 202 is rotated, the female thread pushes the male thread 602 to move the lens holder 203 upward as shown in FIG. 11. Since the lens holder 203 is moved upward, a portion of the male thread 602 will be exposed.

In this embodiment, the resilient element 206 is anchored with the barrel 202 and the frame 201 (not shown in FIGS. 10 and 11), while the electric current supplied to the electromagnet 2071 and the electromagnet 2072 is cut off, the repulsion disappears, and the resilience of the resilient element 206 forces the barrel 202 to rotate in a reverse direction to resume the lens holder 203 to its original status as shown in FIG. 10. The male thread 602 is not limited to be designed on the external wall of the lens holder 203, but the internal wall of the barrel 202 instead, and the female thread is designed on the external wall of the lens holder 203. Any method capable of engaging the threads of the lens holder 203 and the barrel 202 are intended to be covered in the scope of the present invention.

As described in the foregoing three preferred embodiments, the barrel includes a first linkage structure, a lens holder comprises a second linkage structure, and the lens holder is mounted on the barrel through the second linkage structure and the first linkage structure respectively. In the first preferred embodiment, the first linkage structure is a slide slot 208, and the second linkage structure is a fixing pillar 209. In the second preferred embodiment, the first linkage structure is a barrel threaded cut surface 401, and the second linkage structure is a holder threaded cut surface 402. In the third preferred embodiment, the first linkage structure is a first thread (such as a male thread 602), and the second linkage structure is a second thread (such as a female thread). The foregoing embodiments are used for illustrating the present invention only, but not intended to limit the scope of the invention. Any equivalent mechanism that allows the barrel to rotate and drive the lens holder to move is intended to be covered in the scope of the invention.

In the aforementioned three preferred embodiments, electric power is supplied to the electromagnet 2071 and the electromagnet 2072 to produce a repulsion force to move the lens driving apparatus, but the invention is not limited to such arrangement only, but any equivalent ways including but not limited to electrically connect a plurality of electromagnets to produce an electromagnetic field between the electromagnets to produce a repulsion or an attraction, and use the resilience force of the resilient element to rotate the barrel in a reverse direction to drive the lens holder to move between the first position and the second position of the lens driving apparatus.

The electromagnet core of the electromagnet 2071 and the electromagnet 2072 can be made of a soft magnetic material (such as a soft magnet); the soft magnetic material comes with the characteristic of an easy magnetization and demagnetization. The electromagnet can be magnetized very easily after the electric current is supplied to the electromagnet, and the lines of magnetic force are centralized at the distal surfaces of the electromagnet core. However, if electric current supplied to the electromagnet is cutoff, the magnetic force of the electromagnet core will disappear. In general, a soft magnetic material is mainly composed of high-purity iron (such as, Ferrite), steel with a low content of carbon, silicon steel, iron-nickel alloy (Fe—Ni alloy or permalloys), magnesium-zinc alloy (Mg—Zn alloy), nickel-zinc alloy (Ni—Zn alloy), manganese-zinc alloy (Mn—Zn alloy), a metallic glass and etc., so that the soft magnetic material can stand the high temperature of the reflow process, and the lens driving apparatus of the invention can be manufactured in a highly efficient mass production. The resilience of the resilient element can be achieved by a compression spring or an extension spring, and the structural mode such as a solenoid spring or not a solenoid spring, the number of resilient elements or the position of installing the resilient elements are not limited to those described in the preferred embodiments, but those factors can be adjusted according to the requirements of the design of the lens driving apparatus or the direction of current entering into the electromagnet.

What is claimed is:

1. An apparatus for driving a lens by electromagnetic force, applicable to a camera module, the apparatus comprising:
   a frame;
   a barrel, mounted on the frame such that the barrel is rotable on the frame, and the barrel comprising a first linkage structure;
   a lens holder holding a lens, the holder comprising a second linkage structure, coupled to the barrel through the second linkage structure and the first linkage structure, and being movable along a central axis of the barrel;
   a kicker, disposed on an external wall of the barrel;
   a plurality of electromagnets, mounted on the frame and the kicker, respectively; and
   a resilient element, anchored with the kicker and the frame;
   wherein when an electric power is applied to the electromagnets, an electromagnetic field is generated to produce a repulsion force or an attraction force between the electromagnets to move the kicker and the barrel, and the lens holder is driven by the second linkage structure through a movement of the first linkage structure to move the lens holder along the central axis from a first position to a second position;
   wherein when the electric power supplied to the electromagnets is disconnected, a resilience of the resilient element rotates the barrel to drive the lens holder by the second linkage structure through the first linkage structure to move along the central axis from the second position back to the first position.

2. The apparatus for driving a lens by electromagnetic force as recited in claim 1, wherein: the first linkage structure is a slide slot; the second linkage structure is a fixing pillar; and wherein the fixing pillar can be passed into the slide slot and moved in the slide slot.

3. The apparatus for driving a lens by electromagnetic force as recited in claim 1, wherein: the first linkage structure is a barrel threaded cut surface, the second linkage structure is a holder threaded cut surface, the barrel threaded cut surface and the holder threaded cut surface are corresponsive to each other, so that when the lens holder is situated at the first position, the barrel threaded cut surface is engaged with the lens holder; the lens holder includes a groove; and the frame includes a corresponding guiding device; and wherein the guiding device is combined with the groove to maintain the lens holder at a non-rotating state, and to allow the lens holder to move along the central axis of the barrel.

4. The apparatus for driving a lens by electromagnetic force as recited in claim 1, wherein: the first linkage structure is a first thread; the second linkage structure is a second thread; the first thread and the second thread are corresponsive with each other, and the lens holder is coupled with the barrel by engaging the first thread with the second thread, such that when the lens holder is situated at the first position; a threaded cut surface of the barrel is attached to a thread of the holder; the lens holder includes a groove; the frame includes a corresponding guiding device; and wherein the guiding device is combined with the groove to maintain the lens holder at a non-rotating state, and to allow the lens holder to move along the central axis of the barrel.

5. The apparatus for driving a lens by electromagnetic force as recited in claim 1, wherein the resilient element is a compression spring or an extension spring.

* * * * *